United States Patent
Veneroso et al.

(10) Patent No.: US 9,143,922 B2
(45) Date of Patent: Sep. 22, 2015

(54) METHOD AND SYSTEM FOR CONTROLLING COMMUNICATION BETWEEN AN UICC AND AN EXTERNAL APPLICATION

(75) Inventors: Amedeo Veneroso, Caserta (IT); Francesco Varone, Bellona (IT); Angelo Castaldo, Afragola (IT)

(73) Assignee: STMICROELECTRONICS INTERNATIONAL N.V., Geneva (CH)

( * ) Notice: Subject to any disclaimer, the term of this patent is extended or adjusted under 35 U.S.C. 154(b) by 332 days.

(21) Appl. No.: 13/339,819

(22) Filed: Dec. 29, 2011

(65) Prior Publication Data
US 2012/0172016 A1 Jul. 5, 2012

(30) Foreign Application Priority Data
Dec. 30, 2010 (IT) .............................. MI2010A2473

(51) Int. Cl.
*H04W 76/00* (2009.01)
*H04W 8/20* (2009.01)
*H04W 12/06* (2009.01)

(52) U.S. Cl.
CPC .............. *H04W 8/205* (2013.01); *H04W 12/06* (2013.01)

(58) Field of Classification Search
CPC ........................... H04W 8/205; H04W 36/385
USPC ......... 455/411, 414.1, 558, 41.2, 11.1, 422.1, 455/432.1, 433, 456.6, 518, 552.1; 370/328, 350, 355, 419; 709/217; 705/44
See application file for complete search history.

(56) References Cited

U.S. PATENT DOCUMENTS

| | | | | |
|---|---|---|---|---|
| 7,382,882 | B1 * | 6/2008 | Immonen ...................... | 380/270 |
| 2004/0092249 | A1 * | 5/2004 | Sugikawa ..................... | 455/411 |
| 2004/0148502 | A1 * | 7/2004 | Gollner et al. ............... | 713/167 |
| 2004/0172536 | A1 * | 9/2004 | Malville et al. .............. | 713/169 |
| 2005/0259673 | A1 * | 11/2005 | Lu et al. ........................ | 370/419 |
| 2005/0261016 | A1 * | 11/2005 | Patel et al. .................... | 455/518 |

(Continued)

FOREIGN PATENT DOCUMENTS

WO WO02054195 A2 * 7/2002 ............... G06F 1/00

OTHER PUBLICATIONS

ST-Ericsson et al., "USAT over AT," 3GPP TSG-CT WG1 Meeting #66, Aug. 23-27, 2010, Xi'an (China), pp. 1-10.

(Continued)

*Primary Examiner* — Parth Patel
(74) *Attorney, Agent, or Firm* — Allen, Dyer, Doppelt, Milbrath & Gilchrist, P.A.

(57) ABSTRACT

A method may be for controlling communication between a UICC, a handset including the UICC, and an external device associated with an external application running outside the handset. The method may include switching on the UICC by the handset, executing a first initialization procedure by the handset to establish a first communication session between the handset and the UICC, establishing a second communication session between the UICC and the external device, and executing a second initialization procedure between the external device and the UICC. The method may include retrieving an attribute of the handset by the UICC after completing the first initialization procedure, retrieving an attribute of the external device via the handset by the UICC after the completing the second initialization procedure, and comparing the attribute of the handset with the attribute of the external device to distinguish the second communication session from the first communication session.

26 Claims, 3 Drawing Sheets

(56) References Cited

U.S. PATENT DOCUMENTS

| | | | |
|---|---|---|---|
| 2006/0129848 A1* | 6/2006 | Paksoy et al. | 713/193 |
| 2006/0154659 A1* | 7/2006 | Roter et al. | 455/422.1 |
| 2006/0291455 A1* | 12/2006 | Katz et al. | 370/355 |
| 2007/0117562 A1* | 5/2007 | Shim et al. | 455/433 |
| 2007/0131780 A1* | 6/2007 | Ho | 235/492 |
| 2008/0092149 A1* | 4/2008 | Rowbotham et al. | 719/321 |
| 2008/0250328 A1* | 10/2008 | Konttinen | 715/747 |
| 2009/0165077 A1* | 6/2009 | Heiner et al. | 726/1 |
| 2009/0313472 A1* | 12/2009 | Guccione et al. | 713/171 |
| 2009/0319428 A1* | 12/2009 | Febonio et al. | 705/44 |
| 2010/0311467 A1* | 12/2010 | Wu | 455/558 |
| 2011/0003590 A1* | 1/2011 | Yoon et al. | 455/432.1 |
| 2011/0078025 A1* | 3/2011 | Shrivastav | 705/14.64 |
| 2011/0081950 A1* | 4/2011 | Guven | 455/558 |
| 2011/0154460 A1* | 6/2011 | Khare et al. | 726/7 |
| 2011/0225418 A1* | 9/2011 | Shipley et al. | 713/153 |
| 2011/0252172 A1* | 10/2011 | Sun et al. | 710/305 |
| 2011/0320562 A1* | 12/2011 | Lane et al. | 709/217 |
| 2012/0072979 A1* | 3/2012 | Cha et al. | 726/7 |
| 2012/0254959 A1* | 10/2012 | Schmidt et al. | 726/6 |

OTHER PUBLICATIONS

"Smart Cards; Card Application Toolkit (CAT)," ETSI TS 102 223, V9.1.0, Apr. 2004, pp. 1-209.

Ericsson, "SIM Access via 'SIM Access Profile' and Bluetooth Link," 3GPP TSG SA WG3 Security, Jul. 15-18, 2003, San Francisco, California, pp. 1-7.

"3rd Generation Partnership Project; Technical Specification Group Core Network and Terminals; Universal Subscriber Identity Module (USIM); Application Toolkit (USAT)," 3GPP TS 31.111, V.10.0.0, Oct. 2010, pp. 1-109

Krummel, "SIM Access Profile, Interoperability Specification," Nov. 4, 2008, pp. 1-52.

* cited by examiner

METHOD AND SYSTEM FOR CONTROLLING COMMUNICATION BETWEEN AN UICC AND AN EXTERNAL APPLICATION

FIELD OF THE INVENTION

The present disclosure relates to a method and system for controlling communication between an integrated circuit (IC) card and an external device.

BACKGROUND OF THE INVENTION

A method for controlling communication between a universal integrated circuit card (UICC) and an external device provides that a handset including the UICC executes some steps to drive the connection between the UICC and the external device. With reference to FIG. 1, a communication environment between a UICC 10 and an external device 14, for example, a PC 14, via Bluetooth is shown. The UICC 10 is plugged into the handset 12. The PC 14 is coupled to a server 16 via the Internet or other types of network connections. An external application resides in the PC 14 or in the server 16 for communicating with the UICC 10. The handset 12 is coupled to PC 14 via Bluetooth 18. The Bluetooth SIM Access Profile (SAP) can be used for communication between the UICC 10 and PC 14.

When the handset 12 is in the range of a device supporting Bluetooth SAP, i.e. PC 14, they may be connected. The connection can be automatic or triggered upon a positive command of the handset 12 user, who is prompted with a notification message on the handset 12 display. When the handset 12 and the PC 14 are coupled, the handset 12 stops sending Application Protocol Data Unit (APDU) generated by itself to the UICC 10. It rather starts sending to the UICC 10 the APDUs received from the external device 14. Any type of APDU is dispatched. For example, if the Bluetooth SAP enabled external device 14 includes telecommunication capabilities, it works as a mobile telephone using the mobile number and network authentication credentials related to the UICC 10, while this is still inserted in the handset 12. This is a common situation, since many current SAP devices are hands-free speaker car-kits. In this case, UICC 10 is not aware of which, the handset 12 or the external device 14, is accessing it in a given moment.

More particularly, the steps described above with reference to FIG. 1 include: switching on the UICC by an handset including the UICC; executing a first initialization procedure by the handset, to establish a first communication session between the handset and the UICC; sending a connection request to the handset by the external device or vice versa, to establish a second communication session between the UICC and the external device; and executing a second initialization procedure between the external device and the UICC.

The second initialization procedure may be needed since the UICC and the external device have to exchange information about their respective characteristics to operate correctly. In particular, external devices could have different characteristics with respect to the handset.

Several problems may occur in the communication between the UICC and the external device described above. A first problem may occur after a successful PIN authentication of the external device, for example, because an application of the external device may access the user's personal data while pretending it is furnishing a certain service or data. Otherwise, the application can modify the personal data stored in the UICC 10 without authority. Another problem may occur because the UICC operability is interrupted, for example, because the external device 14 performs a PIN verification with a wrong PIN: after just few attempts, the UICC 10 is blocked by the incorrect PIN input, and this blocks all other access from other applications until the owner of UICC 10 resets the handset 12 and inputs the correct unblock number (PUK) for the UICC. Nevertheless, the UICC operability may be compromised if the external device 14 performs a small series of PIN unblocks with a wrong PUK number. In all these cases, the UICC 10 cannot detect whether it is coupled by the handset 12 or by the third-party's external application, i.e. by the external device, and thus it simply responds to the requests as they arrive from the handset.

In several application environments, including an interaction of UICC with Internet oriented environments, such as the USB protocol, Smart Card Web Server, W-LAN and GBA, would be very useful to use the high confidential credential information on the UICC to authenticate the user. This would allow launching business models with $3^{rd}$ parties and Web merchants providing authentication services based on UICC, with the network operator able to identify and provide/guarantee the user identity, for example, for purchasing over the Internet with the user credential authenticated by the UICC.

However, while the direct communication between an external device, such as a PC, and the UICC gives a convenience to the user, it can threaten the security and privacy of the handset owner, since the UICC 10 cannot detect whether it is logically connected to the handset or to the third-party's external application running on the external device, and it simply responds to the requests as they arrive from the handset. Thus, unauthorized software can access some of the private information contained in UICC without granted permission from the owner of UICC, and dangerous software can act as a virus to the whole system.

It's worth noting that an external device, such as a PC, enabled to communicate with an UICC using a wireless protocol is more critical than a personal handset from the security point of view. In fact, the external device could not be either maintained or owned by the UICC owner, since it could be a service offered in a public environment (bar, cinema, museum, transportation station). Therefore, the UICC owner cannot safeguard its security; moreover, a PC is more vulnerable to viruses and malicious software than typical handsets, because of the higher grade of programmability. Nevertheless, the same issues could also affect a personal handset.

SUMMARY OF THE INVENTION

A potential drawback may comprise the UICC 10 being exposed to a malicious or malfunctioning application, since the UICC 10 may grant full access to unknown third-party's external application and devices when the unknown third-party's external application and devices connect the handset 12.

An approach may comprise a UICC with technical features for distinguishing a communication session with an external device with respect to a communication session with a handset.

According to this approach, a method for controlling communication among a UICC, a handset including the UICC, and an external device associated with external application running outside of the handset. The method may comprise switching on the UICC by the handset, executing a first initialization procedure by the handset to establish a first communication session between the handset and the UICC, and exchanging a connection request between the handset and the external device, to establish a second communication session between the UICC and the external device. The method may include executing a second initialization procedure between the external device and the UICC, retrieving an attribute of the handset by the UICC after the step of executing the first initialization procedure, retrieving an attribute of the external device via the handset by the UICC after the step of executing the second initialization procedure, and comparing the attribute of the handset with the attribute of the external device to distinguish the second communication session from the first communication session.

Advantageously, according to the method of the invention, the UICC distinguishes the communication session with the external application from the communication session with the handset; thus, the UICC knows where APDU packets are generated, i.e. in the handset or in the external device, and can manage different access rights for UICC resources and applications, depending from the APDU packets originators.

The method can be applied for all protocols where the origin of the instruction received by the UICC should be detected. Preferably, the second communication session may be a Bluetooth SAP session with the external device.

According to an aspect of the present disclosure, the attribute of the handset is the International Mobile Equipment Identity (IMEI) of the handset. The IMEI is a number identifying mobile phones operating in a network, such as GSM, WCDMA, and iDEN, as well as some satellite networks. The external application should have an assigned unique IMEI assigned by an authority entity and provides it to UICC, when the UICC request it for detection. The IMEI number provided by the external application is different from the IMEI number of the handset; therefore, the UICC distinguishes with which device it is communicating.

A non-standard external application may randomly generate an arbitrary IMEI number or store a specific IMEI number, but it is unlikely it matches to the handset IMEI. A malicious external application might attempt to guess the handset IMEI, but it is almost improbable that such application succeed in doing so, since the IMEI is a very long number, difficult to be detected by capturing other handset activity just using conventional hardware.

In another aspect of the present disclosure, the attribute of the handset may comprise the terminal profile of the handset. The terminal profile is a string that encodes the feature set of the handset, for example, it may be a bit-mapped list of the handset features. The external application may randomly generate arbitrary terminal profile or store a specific terminal profile and provide it to UICC, when the UICC requests it. The terminal profile for the external application may have a same format as that of the handset.

In another aspect of the present disclosure, the APDU instructions available for an external application are limited to a specific subset of instructions accepted by the UICC, for provision of a corresponding service provided by the external application, after the second communication session is established. Each service provided by the external application may have a different requirement for the UICC, so if the UICC can identify the external application (e.g. checking if the external device IMEI is in a given range or has a given structure, observing the kind of APDUs received etc.), it can limit the available APDU instructions to a specific subset according to the service. Alternatively, it can limit the available APDU instructions regardless of the service.

In another aspect of the present disclosure, APDU or APDU data are communicated through a predetermined protocol between the UICC and the external application, after the second communication session is established. The predetermined protocol may be a secret protocol which is known only to the UICC and the external application. This ensures the confidentiality between UICC and external application and makes it more difficult for malicious application to eavesdrop on the communication of UICC and external application.

In another aspect of the present disclosure, the UICC returns invalid data to the request for authentication from the external application and disables PIN access after the second communication session is established. In this way, the UICC is not blocked by the malfunction of the external application, even if the external application sends APDU request about PIN verification with a wrong PIN number. Returning non-valid data to the request for authentication from the external application, the UICC enhances the protection of personal data, as well as to ensure the proper operation of the external device storing the external application. On the contrary, if the UICC would not respond to the APDU request about authentication from the external application, it can cause the external device to operate unpredictably.

Further advantages and features of the method and the IC Cards according to the present disclosure may be apparent from the description given here below only for exemplificative purpose and without limiting the scope of protection of the present disclosure.

DETAILED DESCRIPTION OF THE PREFERRED EMBODIMENTS

Figure 1:
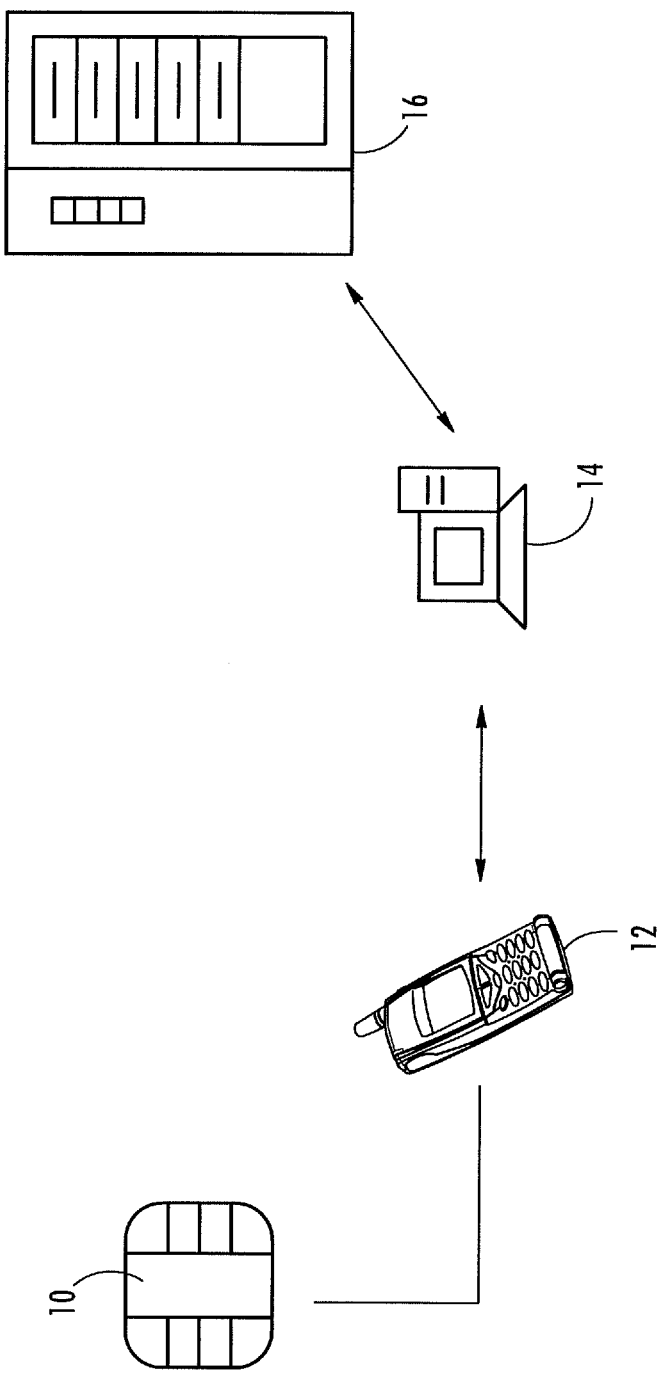
FIG. 1 is a schematic diagram of the devices involved in a method for controlling communication between an UICC and an external application, according to the prior art.
Figure 2:
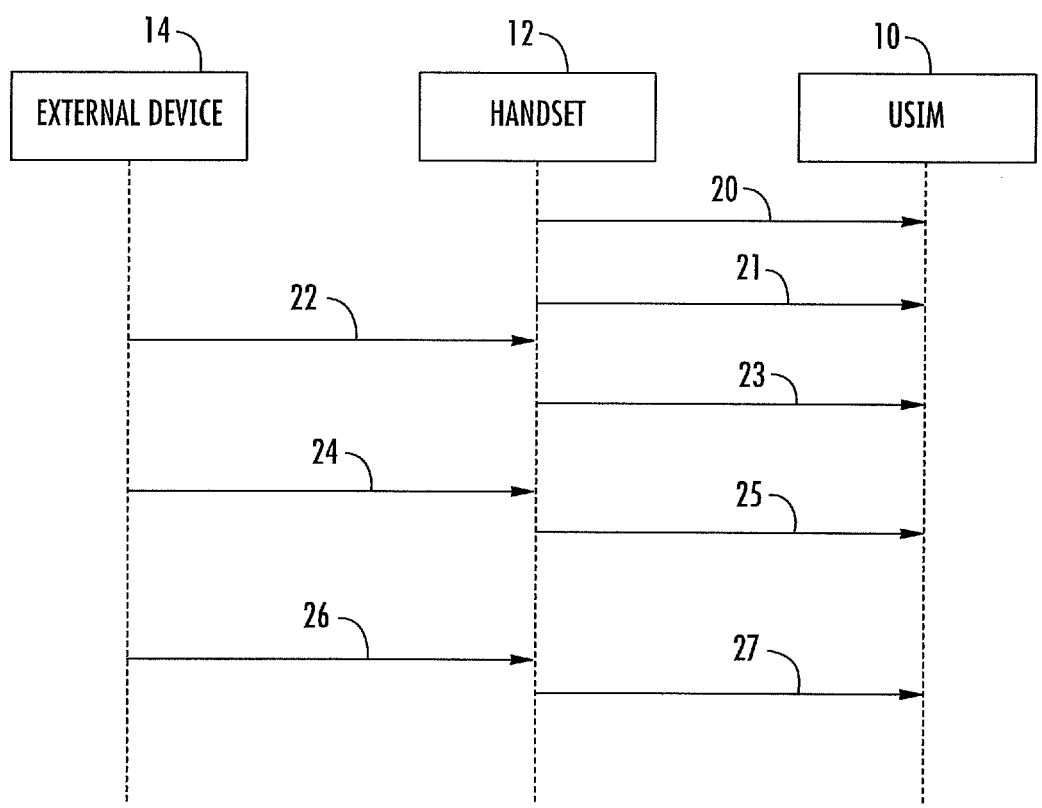
FIG. 2 is a process diagram of initialization among a UICC, a handset, and an external device, according to the present disclosure.

With reference to FIG. 2, the steps of the method for controlling communication among an UICC 10, a handset 12 including the UICC 10, and an external device 14 according to the present disclosure are shown. The external device 14 is associated with an external application running outside of the handset 12.

More particularly, for exemplary purposes, the communication between the external device and the handset may be a Bluetooth SAP session including the following steps: the handset 12 switches on and powers on the UICC 10, i.e. it performs a cold reset. The handset 12 completes the initialization sequence. The external device, for example, a PC 14, gets coupled via Bluetooth and requests the Bluetooth SAP session. The handset 12 terminates the old session and starts a new session, i.e. it performs a soft (warm) reset. From now on, the PC 14 is in charge of sending an initialization sequence.

With regard to the hardware configuration of an application network, the handset 12 may connect to a separate device (not shown), which is adapted to connect to the PC 14 via various means, which include, but are not limited to, USB. Alternatively, the PC 14 may include means or a module for Bluetooth communication internally. Moreover, a server 16 may be accessed by the PC 14 via the Internet or an intra network. The external application runs on the PC 14 solely or may run on the server 16 exchanging requests and responses with the PC 14 via the network. Remote procedure calls can be used for communication between the PC 14 and the server 16.

Alternatively, several modules included by the external application may exist both on the PC 14 and the server 16. It is noted that specific hardware configurations do not limit the scope of the present disclosure.

The warm reset is a method implemented in the handsets to restart the UICC 10 session (e.g. to switch between 2G and 3G or in case of a UICC fault). According to the present disclosure, the UICC 10 distinguishes the warm reset caused by the handset requesting UICC session restart, from the warm reset caused by an external application in the PC 14 for opening a new Bluetooth SAP session. Meanwhile, the cold reset is performed when power is applied to the handset 12 again after the handset 12 is turned off. UICC hardware is capable of detecting the type of reset.

FIG. 2 represents the process diagram of initialization among the UICC, the handset, and the external device according to the Bluetooth SAP session. At step 20, the handset 12 switches on and powers on the UICC. At step 21, the handset 12 sends an initialization sequence to the UICC 10 and completes the initialization process. If the external device 14 wants to access the UICC, which is granted by the handset 12 (according to handset owner preferences) and the handset 12 is in the range of Bluetooth SAP, the external device 14 sends a Bluetooth SAP connection request to the handset 12, at step 22. At step 23, after the handset 12 receives the connection request from the external device 14, the handset 12 sends a warm reset request 23 to the UICC 10. As mentioned before, the warm reset can be used to switch between 2G and 3G, in case of a UICC fault or in some other cases of a UICC over-the-air update to get UICC and terminal synchronized. In this case, the warm reset is performed to start the second initialization. Therefore, the UICC 10 does not know for what the warm reset has been requested.

After warm reset at step 23, all of APDU commands generated by the external device 14 are forwarded to UICC 10 by the handset 12. The handset does not check the specific contents of APDU payload, but merely forwards the payload to the UICC 10. The external device 14 requests the initialization procedure at step 24, and the handset 12 forwards it to the UICC 25. At step 26, the external device 14 sends an APDU request, and the handset 12 forwards it to the UICC (step 27).

According to an aspect of the invention, to distinguish which device is accessing it, the UICC 10 uses the Provide Local Information—IMEI Proactive command as specified in ETSI TS 102 223. This command retrieves the Handset IMEI, i.e. a unique number from handset to handset.

During the UICC first initialization, the UICC 10 reads the Handset IMEI. After a warm reset, the UICC 10 again reads the IMEI. If it is the same as before, the UICC 10 can establish that the warm reset has been caused by the handset 12. If it is different from the previous one, the UICC 10 detects that a Bluetooth SAP session has started.

The two scenarios are hence described to show the different behaviors. Warm reset due to handset request of re-initialization is as follows.

The handset 12 switches on and powers on the UICC (cold reset).
The handset 12 completes the initialization sequence.
The UICC 10 retrieves the handset IMEI.
The handset 12 performs a warm reset.
The handset 12 completes the initialization sequence.
The UICC 10 retrieves the handset IMEI.
Warm reset due to Bluetooth SAP is as follows.
The handset 12 switches on and powers on the UICC (cold reset).
The handset 12 completes the initialization sequence.
The UICC 10 retrieves the handset IMEI.

The external device, i.e. the PC 14 gets coupled via Bluetooth and requests the Bluetooth SAP session.
The handset 12 terminates the old session and starts a new session (warm reset).
The PC 14 performs the initialization sequence.
The UICC 10 retrieves the PC IMEI, as the PC IMEI is not coded. This PC IMEI could also be garbled because the PC 14 answer could result in an error, or the PC does not support the IMEI retrieval, but the PC 14 is however not able to send the IMEI sent by the handset and let the UICC 10 to distinguish between the two sessions.

Figure 3:
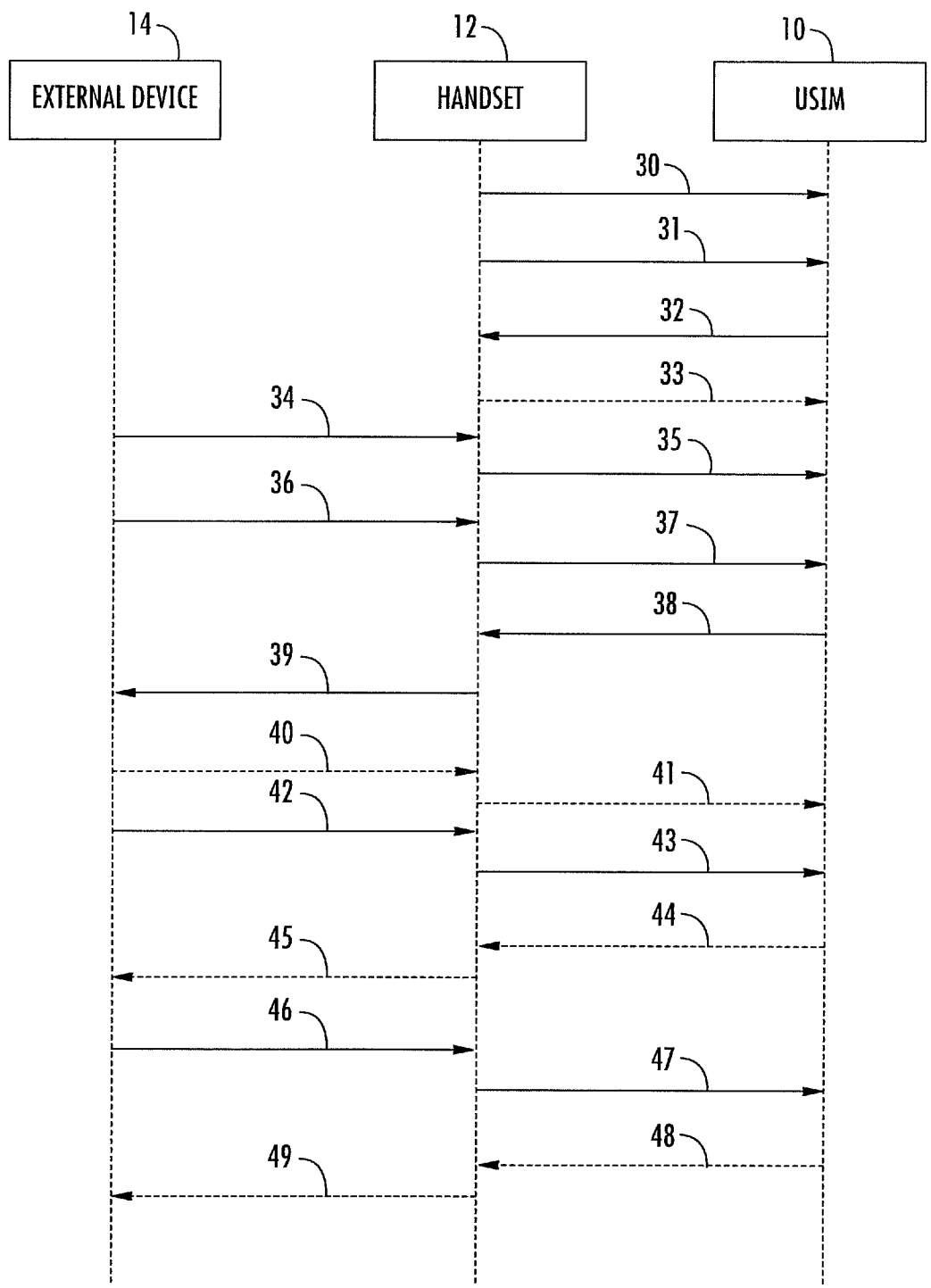
FIG. 3 illustrates the process diagram of initialization among the UICC, the handset, and the external device using IMEI verification, according to the present disclosure.

FIG. 3 illustrates the process diagram of initialization among the UICC, the handset, and the external device according to the Bluetooth SAP session using IMEI verification. More particularly, an exemplary situation where the external application accesses the UICC via Bluetooth SAP is explained hereinafter in detail. At step 30, the handset 12 switches on and powers on the UICC 10. At step 31, the handset 12 sends an initialization sequence to the UICC 10 and completes the initialization process. Then, at step 32, the UICC 10 issues the Provide Local Information command to the handset 12 to retrieve the IMEI of the handset 12. At step 33, responding the Provide Local Information command of the UICC 10, the handset 12 sends its IMEI information to the UICC 10. The UICC may store this information in its memory, for example, a non-volatile memory.

When the handset 12 is in the range of the Bluetooth connection of the external device 14, and the handset 12 and/or the UICC 10 are configured to communicate with the external device 14, the external device 14 sends a connection request to the handset 12 at step 34. Receiving the connection request from the external device 14, the handset 12 sends a warm reset command to the UICC 10 at step 35. Then, the UICC is reset and waits for new initialization sequence from the handset 12. From step 35, since the Bluetooth SAP session is established, the handset 12 is merely forwarding all messages received from either of the external device 14 or the UICC 10 to the other entity.

At steps 36 and 37, the external device 14 issues an initialization sequence to the handset 12 and the handset 12 forwards it to the UICC 10. After having responded to the initialization sequence at step 38, the UICC issues a Provide Local Information command to the handset 12, and the handset 12 at this time does not reply with its IMEI to the UICC 10 but forwards the Provide Local Information command to the external device 14 at step 39.

Then, at step 40, the external device 14 sends a number to the handset 12. The number is compared with the IMEI of the handset 12 by the UICC 10. The number may be randomly generated by the external device 14, whenever it is requested, or may be a predetermined value since the application was initially produced, for example, a number assigned by the relevant authority. Alternatively, the number may be changed periodically. The number can be used for the UICC to confirm that the Bluetooth SAP session is established and the APDU payload comes from another device, not from the handset 12. At step 41, the handset 12 forwards the number to the UICC 10.

At step 42, the external device 14 may send generic APDUs to the handset 12, and the handset 12 may forward it to the UICC at step 43. The generic APDUs may include requests, such as PIN verification request or request for accessing personal data, for example, SMS message or phonebook. At step 43, the generic APDUs are forwarded to the UICC 10, but the UICC 10 restricts this kind of access. Therefore, the UICC may return an empty record at step 44, and the handset 12 forwards it to the external device 14 at step 45. It is possible for the UICC 10 not to return any value; however, preferably, it is better to return an empty record, since if the UICC 10 does not send any reply, the external application may suffer an error, such as an application crash.

Instead of adopting the IMEI, the terminal profile of the handset can be used to detect the start of a SAP session. The terminal profile is a bit-mapped list of the handset features. Although similar, almost all handset models have slightly different profiles. After detecting when the APDU packets are originated, the UICC can adopt additional security measures to protect its information, for example, from viruses or Trojan applications. The UICC may enforce an authentication procedure (e.g. encryption) for response and request of APDU with the external application. Alternatively, the UICC can initiate a separate communication session after the detection.

When the SAP session is detected, the UICC can apply various measures for security. It can limit the available APDU instructions to a specific subset, those strictly needed for the provisioning of a given service from the external application. Alternatively, it can allow the APDUs carried over some security protocol agreed by the UICC issuer and the service provider. Furthermore, it can disable PIN input from the external application, and still deny the access to personal data, such as SMS and phonebook.

Specifically, for compatibility, the access to those files is preferably allowed because an access condition error while the PIN is disabled could result in unpredictable behavior of the external device. In this case, personal data can be still protected returning empty records from the UICC instead of record including stored data. A similar measure can be applied to the update, in that the data to be written is not actually stored in memory, still returning a successful response. In any case, the external device may not compromise or damage personal data.

After communication between the external application and the UICC is started, preferably the UICC does not return valid data in requests for authentication (e.g. authentication challenge). This can prevent the external device, which is not entitled to use user credentials, from setting up calls and also protects from security attacks to authentication keys of the UICC.

After communication between the external application and the UICC is started and also an external authentication procedure has been successfully performed, the UICC can provide to the external device all features available to a normal handset without the limitations and/or expose dedicated features only available to authenticated external devices.

The present embodiments, which have been described with reference to Bluetooth connection, are not limited to such connection and can be applied to all protocols where the UICC should detect the origin of the communication sessions and the received instructions.

Advantageously, the method of the present disclosure allows the UICC to distinguish a communication session with the external application from a communication session with the handset, and thus to distinguish APDU packets generated by the external application from APDU packets generated from the handset. Accordingly, the UICC can restrict access to its resources and services by the part of the external application. Additionally, the UICC can provide a dedicated service suitable for trusted external applications.

That which is claimed is:

1. A method for controlling communication among an universal integrated circuit card (UICC), a handset including the UICC, and an external device associated with an external application running outside of the handset, the method comprising:

switching on the UICC via the handset;

after the switching, executing a first initialization procedure via the handset to establish a first communication session between the handset and the UICC;

after the executing of the first initialization procedure, executing a second initialization procedure for exchanging a connection request between the handset and the external device to establish a second communication session between the UICC and the external device, the handset causing the UICC to reset when the connection request is received and during the second initialization procedure;

using the UICC to retrieve a unique handset identification number of the handset after completing the first initialization procedure;

after the retrieving of the unique handset identification number, storing the unique handset identification number in a memory of the UICC;

using the UICC to retrieve an attribute of the external device via the handset after completing the second initialization procedure;

using the UICC to compare the unique handset identification number of the handset with the attribute of the external device to distinguish the second communication session from the first communication session; and when the unique handset identification number of the handset and the attribute of the external device do not match and subsequently receiving a request from the external device for a record stored in the UICC, using the UICC to reply with an empty record.

2. The method according to claim 1 wherein the unique handset identification number of the handset comprises an International Mobile Equipment Identity (IMEI).

3. The method according to claim 1 wherein the unique handset identification number of the handset comprises a terminal profile of the handset.

4. The method according to claim 1 wherein the attribute of the external device comprises at least one of a predefined value and an external application generated value.

5. The method according to claim 1 wherein the second communication session comprises Bluetooth SIM Access Profile (SAP) session.

6. The method according to claim 1 further comprising limiting an available application protocol data unit (APDU) instruction to a specific subset for provisioning of service provided by the external application after the second communication session is established.

7. The method according to claim 1 further comprising communicating APDUs through a predetermined protocol between the UICC and the external application after the second communication session is established.

8. The method according to claim 1 wherein the UICC returns non-valid data to a request for authentication from the external application.

9. The method according to claim 1 further comprising the UICC disabling personal information number (PIN) access after the second communication session is established.

10. A method for controlling communication among an integrated circuit (IC) card, a handset including the IC card, and an external device outside of the handset, the method comprising:

establishing by the handset a first communication session between the handset and the IC card;

after establishing the first communication session, exchanging a connection request between the handset and the external device to establish a second communication session between the IC card and the external device, the handset causing the IC card to reset when the connection request is received and during the establishing of the second communication session;

using the IC card to retrieve a unique handset identification number of the handset after completing the first communication session;

after the retrieving of the unique handset identification number, storing the unique handset identification number in a memory of the IC card;

using the IC card to retrieve an attribute of the external device via the handset after completing the second communication session;

using the IC card to compare the unique handset identification number of the handset with the attribute of the external device and to distinguish the second communication session from the first communication session; and when the unique handset identification number of the handset and the attribute of the external device do not match and subsequently receiving a request from the external device for a record stored in the IC card, using the IC card to reply with an empty record.

11. The method according to claim 10 wherein the unique handset identification number of the handset comprises an International Mobile Equipment Identity (IMEI).

12. The method according to claim 10 wherein the unique handset identification number of the handset comprises a terminal profile of the handset.

13. The method according to claim 10 wherein the attribute of the external device comprises at least one of a predefined value and an external application generated value.

14. The method according to claim 10 wherein the second communication session comprises Bluetooth SIM Access Profile (SAP) session.

15. An integrated circuit (IC) for a universal integrated circuit card (UICC) to be inserted in a handset, the handset communicating with an external device associated with an external application running outside of the handset, the handset switching on the UICC and executing a first initialization procedure to establish a first communication session between the handset and the UICC, the IC comprising:

a memory and processor in cooperation therewith and configured to after establishing the first communication session, exchange a connection request with the external device to establish a second communication session between the UICC and the external device, the handset causing the UICC to reset when the connection request is received and during the establishing of the second communication session, execute a second initialization procedure between the external device and the UICC, retrieve a unique handset identification number of the handset after the handset completes the first initialization procedure, after the retrieving of the unique handset identification number, storing the unique handset identification number in said memory, retrieve an attribute of the external device via the handset after the external device completes the second initialization procedure, compare the unique handset identification number of the handset with the attribute of the external device to distinguish the second communication session from the first communication session, and when the unique handset identification number of the handset and the attribute of the external device do not match and subsequently receiving a request from the external device for a record stored in said memory, reply with an empty record.

16. The IC according to claim 15 wherein said memory and processor are configured to retrieve the unique handset identification number of the handset comprising an International Mobile Equipment Identity (IMEI).

17. The IC according to claim 15 wherein said memory and processor are configured to retrieve the unique handset identification number of the handset comprising a terminal profile of the handset.

18. The IC according to claim 15 wherein said memory and processor are configured to retrieve the attribute of the external device comprising at least one of a predefined value and an external application generated value.

19. The IC according to claim 15 said memory and processor are configured to establish the second communication session comprising a Bluetooth SIM Access Profile (SAP) session.

20. The IC according to claim 15 wherein said memory and processor are configured to limit an available application protocol data unit (APDU) instruction to a specific subset for provisioning of service provided by the external application after the second communication session is established.

21. The IC according to claim 15 wherein said memory and processor are configured to communicate APDUs through a predetermined protocol between the UICC and the external application after the second communication session is established.

22. An integrated circuit (IC) for an IC card to be inserted in a handset, the handset communicating with an external device outside of the handset, the handset establishing a first communication session between the handset and the IC card, the IC comprising:

a memory and processor in cooperation therewith and configured to after establishing the first communication session, exchange a connection request with the external device to establish a second communication session between the IC card and the external device, the handset causing the IC card to reset when the connection request is received and during the establishing of the second communication session, retrieve a unique handset identification number of the handset after the handset completes the first communication session, after the retrieving of the unique handset identification number, storing the unique handset identification number in said memory, retrieve an attribute of the external device via the handset after the external device completes the second communication session, compare the unique handset identification number of the handset with the attribute of the external device to distinguish the second communication session from the first communication session, and when the unique handset identification number of the handset and the attribute of the external device do not match and subsequently receiving a request from the external device for a record stored in said memory, reply with an empty record.

23. The IC according to claim 22 wherein said memory and processor are configured to retrieve the unique handset identification number of the handset comprising an International Mobile Equipment Identity (IMEI).

24. The IC according to claim 22 wherein said memory and processor are configured to retrieve the unique handset identification number of the handset comprising a terminal profile of the handset.

25. The IC according to claim 22 wherein said memory and processor are configured to retrieve the attribute of the external device comprising at least one of a predefined value and an external application generated value.

26. The IC according to claim 22 said memory and processor are configured to establish the second communication session comprising a Bluetooth SIM Access Profile (SAP) session.

\* \* \* \* \*